Sept. 15, 1931.　　　　L. H. WATKINS　　　　1,823,811
SUPERCHARGER
Filed May 1, 1929　　　　2 Sheets-Sheet 1

INVENTOR.
Leon H. Watkins
BY Munn &
ATTORNEYS.

Sept. 15, 1931.   L. H. WATKINS   1,823,811
SUPERCHARGER
Filed May 1, 1929   2 Sheets-Sheet 2
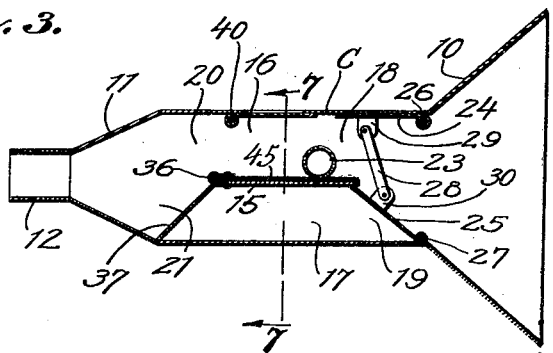
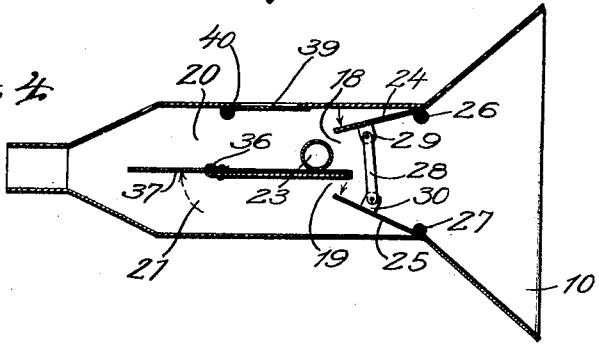
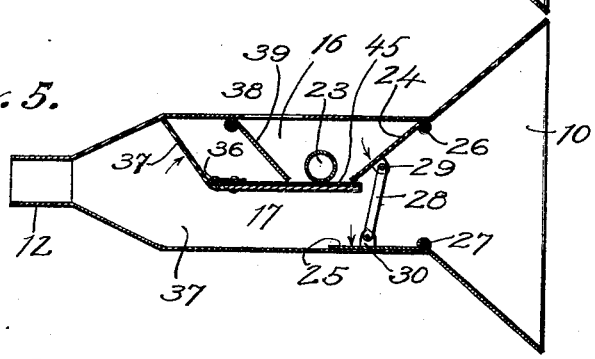
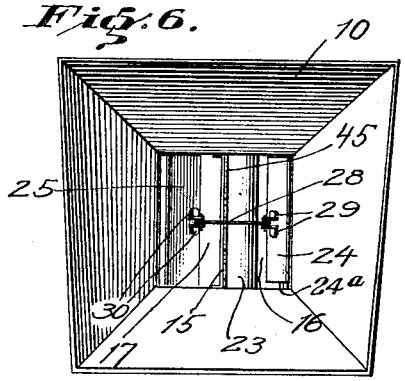
INVENTOR.
Leon H. Watkins
ATTORNEYS.

Patented Sept. 15, 1931

1,823,811

UNITED STATES PATENT OFFICE

LEON H. WATKINS, OF PASADENA, CALIFORNIA

SUPERCHARGER

Application filed May 1, 1929. Serial No. 359,543.

My invention relates to and has for its purpose the provision of a supercharger of simple, substantial and inexpensive construction, particularly adapted, although not necessarily for use on automobile motors, and by which air will be delivered to the carburetor of the motor in sufficient quantity to insure an adequate supply of air for the motor to operate at maximum efficiency with a minimum consumption of fuel.

It is a further purpose of my invention to provide a supercharger, which in its association with the motor of an automobile for example, is operable automatically as a result of forward motion of the automobile, to compress relatively large quantities of atmospheric air and deliver the air under pressure to the air intake of the motor's carburetor so as to insure a greatly increasing supply of air to the motor over that which would ordinarily be drawn into the carburetor solely by motor suction, thus resulting in higher motor efficiency and a material saving in fuel.

It is a further purpose of my invention to provide a supercharger by which heated air, unheated air, or any proportionate mixture of the two can be delivered to the carburetor of a motor, so as to compensate for variations in temperature of the atmosphere and of the motor and thus permit the most efficient carburetion to be obtained under all operating temperatures.

I will describe only one form of supercharger embodying my invention and will then point out the novel features thereof in claims.

In the accompanying drawings,

Fig. 3 is a longitudinal sectional view of the supercharger taken on the line 3—3 of Fig. 1 and illustrating one position of adjustment of the supercharger to deliver only heated air to the carburetor;

Fig. 4 is a view similar to Fig. 3 and illustrating the position of adjustment of the supercharger to deliver a mixture of heated and unheated air to the carburetor;

Fig. 5 is also a view similar to Fig. 3 and illustrating the position of adjustment of the supercharger to deliver only unheated air to the carburetor;

Fig. 6 is a view of the supercharger in front elevation; and,

Fig. 7 is a transverse sectional view taken on the line 7—7 of Fig. 3 and looking in the direction of the arrows.

Figure 1:
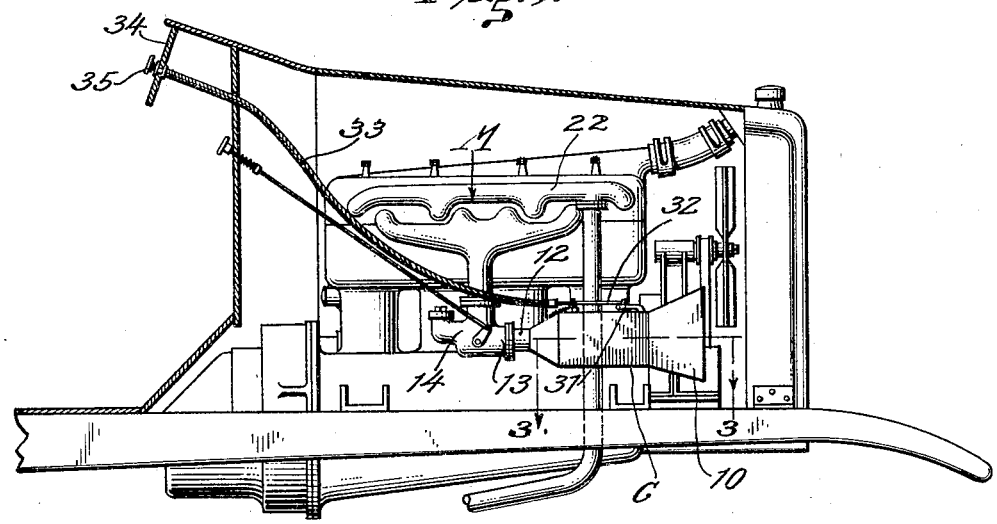
Fig. 1 is a view showing in side elevation one form of supercharger embodying my invention, applied to the motor of a conventional automobile.
Figure 2:
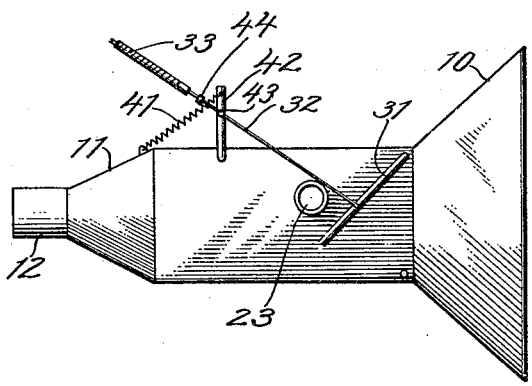
Fig. 2 is an enlarged plan view of the supercharger shown in Fig. 1.

Referring specifically to the drawings in which similar reference characters designates similar parts in each of the several views, my invention in its present embodiment comprises a casing C preferably constructed of sheet metal and of rectangular form. The casing is open at one end and provided thereat with a mouth 10, the walls of which flare outwardly as shown in Fig. 1 so that air forced into the mouth will be compressed by the latter and will traverse the casing under pressure. The opposite end of the casing is also open and is constricted as indicated at 11 to further compress a stream of air traversing the casing. The constricted portion 11 terminates in a sleeve 12 adapted to be secured to the air intake 13 of a conventional carburetor 14 as employed with the usual internal combustion motor M of an automobile, so that with the casing supported horizontally alongside the motor M as shown in Fig. 1, and the inlet or mouth 10 of the casing directed forwardly of the automobile, atmospheric air in advance of the enlarged frontal area of the mouth will be forced into the latter during forward motion of the automobile, and compressed into the casing, from whence the air will be forced under pressure to the air intake 13 of the carburetor 14, thus greatly increasing the quantity of air delivered to the carburetor in a given period of time and as a result greatly increasing the efficiency of the motor as well as effecting a material saving in fuel.

The casing C is divided interiorly by a longitudinal partition 15 co-operating with the casing to provide a passage 16 for heated air and a passage 17 for unheated air. The passages 16 and 17 are provided with inlets 18 and 19 respectively, and outlets 20 and 21 respectively so that the compressed air forced into the casing as a result of forward motion of the automobile will be free to traverse the passages in two separate streams merging into each other after discharging from the outlets 20 and 21. In order to heat air traversing the passage 16 the latter is placed within the heating range of the exhaust conduit 22 of the motor M, and in the present instance the exhaust pipe 23 from the motor extends transversely through the passage 16 so that the hot exhaust gases discharging from the motor through the exhaust pipe will effect heating of the air traversing the passage 16.

To supply either heated air, unheated air or any proportionate mixture of the two to the carburetor 14 in accordance with variations in temperature of the atmosphere and the motor, so that the most efficient carburetion can be had, I provide a pair of valves in the form of doors 24 and 25, the former controlling the inlet 18 and the latter the inlet 19. The doors 24 and 25 are hingedly mounted on the side walls of the casing in advance of the forward end of the partition 15 as indicated at 26 and 27 respectively and are operatively connected by a link 28 pivotally connected to ears 29 and 30 on the doors so that the doors will move in unison and will function to close one inlet 18 or 19 and open the other or vice versa according as the doors are swung about their respective hinge mountings.

For actuating the doors, an arm 31 is fixed to the door 24 at the hinged mounting thereof, and to the arm is connected one end of a flexible wire 32 enclosed in a flexible conduit 33 and leading to a location on the instrument board 34 of the automobile, convenient to the driver as shown in Figure 1. The wire 32 at the instrument board is provided with a button 35 adapted to be grasped by the driver to exert a pull or push upon the wire and thus effect swinging movement of the doors 24 and 25 in one direction or the other. Thus the doors can be moved to admit any proportionate amount of the total quantity of air entering the casing, to the passages 16 and 17 or admit all the air to one passage to the exclusion of the other so that the temperature of the air delivered to the carburetor can be varied at will from a minimum determined by the temperature of the atmosphere to a maximum determined by the effective heating capacity of the exhaust gases traversing the exhaust pipe 23.

It will be noted that the doors when closing their respective inlets are disposed at an incline to the path of the air, so as to function to deflect the air smoothly into the other passage and thus not impede the air flow.

At the rear end of the partition 15 is hingedly mounted at 36 so as to swing freely, a door 37 which controls and is common to the two outlets 20 and 21; the position of the door with respect to the passages 16 and 17 being such that when the inlet 18 or 19 is closed by the respective door 24 or 25, the air traversing the passage whose inlet is open will act upon the door 37 and move the latter to a position to close the outlet of the passage whose inlet is closed, thus preventing the setting up of eddy currents in the latter passage, which would retard the flow of air.

The heated air passage 16 is provided with a vent in the form of an opening 38 in the wall of the casing C; and a vent door 39 fixed to a pintle 40 rotatably mounted in the top and bottom walls of the casing, is normally urged to close the opening 38 by means of a spring 41 connected at one end to the casing and at its other end to an arm 42 fixed to the pintle 40 exteriorly of the casing. The arm 42 is provided with a perforated ear 43 through which the flexible wire 32 is freely threaded; and to the wire is secured a collar 44, which engages the ear 43 to rock the arm 42 and move the door 39 to the open position shown in Fig. 5 wherein the door rests against the partition 15, during closing movement of the door 24, so that when the door 24 is closed, the vent door 39 will be open, to vent the interior of the passage 16 to atmosphere and thus permit the heat from the exhaust pipe 23 to escape from the passage as well as prevent any heated air from reaching the outlet 20 and mixing with unheated air discharging from the outlet 21. Thus the heat from the exhauset pipe will be ineffective to heat air traversing the passage 17, and as a further insurance against the transmission of heat from the exhaust pipe to air traversing the passage 17, a sheet of suitable heat insulating material 45 such as asbestos, is secured to and covers the partition 15. It will be noted that the lower edge 24$^a$ of the door 24 is slightly spaced from the confronting wall of the casing as shown in Figure 6 so that the door 24 when in closed position will not completely close the inlet 18 and will thus permit a slight circulation of air through the passage 16 to aid in conducting the heat from the exhaust pipe to the atmosphere through the vent opening 38.

From the foregoing description it will be manifest that either heated air, unheated air or any proportionate mixture of the two can be delivered to the air intake of the carburetor, and that as a result of compressing the air and forcing the air under pressure to the carburetor, an increased quantity of air will be supplied to the cylinders of the motor in a given time, thus greatly increasing the efficiency of the motor and effecting a material saving in fuel.

Although I have herein shown and described only one form of supercharger embodying my invention, it is to be understood that various changes and modifications may be made therein without departing from the spirit of the invention and the spirit and scope of the appended claims.

I claim:

1. In combination with an automobile having an internal combustion motor, means defining a pair of air passages, one of which is disposed within the heating range of the motor's exhaust conduit so as to utilize the heat of the exhaust gases to effect heating of air traversing the passage, the passages having outlets connected to the air intake of the motor's carburetor and inlets directed forwardly of the automobile so that when the latter is in forward motion air will be forced through the passages to the carburetor, means for directing and compressing the entering air into said passages so that the air will be forced into the carburetor under pressure, doors controlling the inlets of the passages, means for actuating the doors to open one inlet and close the other or vice versa, and means for venting the interior of the heated air passage to atmosphere when its respective inlet is closed.

2. A supercharger comprising means defining a passage for heated air and a passage for unheated air, the passages having inlets through which air is admitted to the passages, and outlets adapted for connection to the air intake of a carburetor to deliver air from the passages to the carburetor, doors controlling the inlets, means for actuating the doors to open and close the inlets, and means for venting the interior of the heated air passage to atmosphere when its inlet is closed.

3. A supercharger comprising means defining a passage for heated air and a passage for unheated air, the passages having inlets through which air is admitted to the passages, and outlets adapted for connection to the air intake of a carburetor to deliver air from the passages to the carburetor, doors controlling the inlets, means for actuating the doors to open and close the inlets, and means for venting the interior of the heated air passage to atmosphere when its inlet is closed, the door controlling the inlet of the heated air passage being ineffective to completely close the inlet when the door is in closed position for the purpose described.

4. A supercharger comprising means defining a passage for heated air and a passage for unheated air, the passages having inlets through which air is admitted to the passages, and outlets adapted for connection to the air intake of a carburetor to deliver air from the passages to the carburetor, doors controlling the inlets, means for actuating the doors to open and close the inlets, the heated air passage having a vent, a door normally closing the vent, and means for opening the vent door when the inlet of the heated air passage is closed.

5. A supercharger comprising means defining a passage for heated air and a passage for unheated air, the passages having inlets through which air is admitted to the passages, and outlets adapted for connection to the air intake of a carburetor to deliver air from the passages to the carburetor, doors controlling the inlets, means for actuating the doors to open and close the inlets, the heated air passage having a vent, a door controlling the vent, means for normally urging the vent door to closed position, and means for moving the vent door to open position when the inlet of the heated air passage is closed.

6. A supercharger comprising means defining a passage for heated air and a passage for unheated air, the passages having inlets through which air is admitted to the passages, and outlets adapted for connection to the air intake of a carburetor to deliver air from the passages to the carburetor, doors controlling the inlets, means for actuating the doors to open and close the inlets, and a freely mounted door common to both outlets, and so positioned with respect to the passages as to be moved by air traversing the passages to close the outlet of one passage or the other when the inlet of the respective passage is closed.

7. A supercharger comprising a casing having a flaring mouth and a partition dividing the casing interiorly into a passage for heated air and a passage for unheated air, the passages having outlets and inlets into which air entering said mouth is compressed by the latter to traverse the passages and discharge from their respective outlets for delivery from the casing to the air intake of a carburetor, doors controlling the inlets, means for actuating the doors to open one inlet and close the other or vice versa, means for venting the interior of the heated air passage to atmosphere when the inlet thereof is closed, and means for closing the outlet of one passage or the other when the inlet of the respective passage is closed.

8. A supercharger comprising a casing having a flaring mouth and a partition dividing the casing interiorly into a passage for heated air and a passage for unheated air, the passages having outlets and inlets into which air entering said mouth is compressed by the latter to traverse the passages and discharge from their respective outlets for delivery from the casing to the air intake of a carburetor, doors controlling the inlets, means for actuating the doors to open one inlet and close the other or vice versa, the heated air passage having a vent, a door normally urged to close the vent, means for opening the door when the inlet of the heated air passage is closed, and a freely mounted door in the casing common to both outlets and so positioned with respect to the air passages as to be moved by air traversing the passages to close the outlet of one passage or the other when the inlet of the respective passage is closed.

9. A device of the character described having a heated air passage provided with an inlet through which air is admitted to the passage and an outlet adapted for connection to the air intake of a carburetor, a valve controlling the inlet, and means for venting the passage to atmosphere when the valve is closing the inlet.

10. A device of the character described having a heated air passage provided with an inlet through which air is admitted to the passage and an outlet adapted for connection to the air intake of a carburetor, a valve controlling the inlet, and means for venting the passage to atmosphere when the valve is closing the inlet, the valve when in closed position, being ineffective to completely close the inlet, so as to permit a circulation of air through the passage to aid in venting heated air from the passage.

LEON H. WATKINS.